(12) United States Patent
Wilfried

(10) Patent No.: US 7,857,335 B2
(45) Date of Patent: Dec. 28, 2010

(54) BODY-SIDE SUSPENSION STRUT BEARING FOR WHEEL SUSPENSIONS

(75) Inventor: Michel Wilfried, Riedenburg (DE)

(73) Assignee: Audi AG, Ingolstadt (DE)

( * ) Notice: Subject to any disclaimer, the term of this patent is extended or adjusted under 35 U.S.C. 154(b) by 206 days.

(21) Appl. No.: 12/111,042

(22) Filed: Apr. 28, 2008

(65) Prior Publication Data
US 2009/0003741 A1 Jan. 1, 2009

(30) Foreign Application Priority Data
Apr. 28, 2007 (DE) .................. 10 2007 020 022

(51) Int. Cl.
*F16F 9/54* (2006.01)
(52) U.S. Cl. .................. 280/124.155; 280/124.145; 403/57
(58) Field of Classification Search .......... 280/124.147, 280/124.155, 124.15, 124.145, 124.146; 384/195, 196; 403/74, 133, 135, 57; 464/134, 464/135, 136; 267/220
See application file for complete search history.

(56) References Cited

U.S. PATENT DOCUMENTS

| | | | | |
|---|---|---|---|---|
| 2,687,099 A | * | 8/1954 | MacVeigh | .................. 105/4.3 |
| 2,823,927 A | | 2/1958 | Goby | |
| 3,703,215 A | * | 11/1972 | Takahashi | .................... 180/256 |
| 4,971,296 A | * | 11/1990 | Kondo | .................... 267/220 |
| 2006/0163787 A1 | * | 7/2006 | Munster et al. | ............. 267/221 |

FOREIGN PATENT DOCUMENTS

| | | |
|---|---|---|
| DE | 19 38 142 U | 5/1966 |
| DE | 1938 142 | 8/1970 |
| DE | 199 60 457 A1 | 9/2000 |
| DE | 100 38 267 A1 | 2/2002 |
| DE | 10 2005 001 742 A1 | 3/2006 |
| DE | 10 2005 001744 B3 | 7/2006 |
| WO | WO 03/106245 A | 12/2003 |

* cited by examiner

*Primary Examiner*—Ruth Ilan
*Assistant Examiner*—Keith Frisby
(74) *Attorney, Agent, or Firm*—Novak Druce + Quigg LLP

(57) ABSTRACT

The invention relates to a body-side suspension strut bearing for wheel suspensions of motor vehicles, with a suspension strut which consists at least of a telescoping shock absorber and a bearing spring, and which is supported by way of a shock absorber bearing on the body and by way of another bearing on the wheel suspension elements of the motor vehicle, there being a joint between the body and the suspension strut. A suspension strut bearing which is favorable in terms of construction, production engineering and function, is achieved by the joint being formed by a universal joint with two crossing axes of rotation.

11 Claims, 5 Drawing Sheets

BODY-SIDE SUSPENSION STRUT BEARING FOR WHEEL SUSPENSIONS

BACKGROUND OF THE INVENTION

Such a suspension strut bearing is described in DE 10 2005 001 742 A1 in which the piston rod of the telescoping shock absorber of the suspension strut is connected via a ball and socket joint to the absorber bearing and the latter to the body of the vehicle. The ball and socket joint consists of a piston rod-side ball head which is supported in an absorber-side ball socket. The ball and socket joint makes it possible to avoid transverse forces which act on the piston rod of the shock absorber and which can occur as a result of pivoting motions of the wheel suspension elements, for example, of a suspension arm which is connected to the shock absorber.

The illustrated ball and socket joint, however, must be designed to have a relatively large volume for reasons of design, in order to be able to withstand especially dynamic loads in the direction of compression and tension. Moreover, the coupling and support of the spring plate which borders the ball and socket joint on the piston rod of the shock absorber can be a problem.

In this ball and socket joint solution, in the course of driving, support forces under a compressive load are delivered into the large projection surface of the ball head. When the ball and socket joint is loaded in tension, however, there is the risk of the ball head "popping" out of the socket. I.e., that the capacity of the ball and socket joint to accommodate the forces due to positive locking in the two directions of loading is different. Under tensile loading the magnitude of the force to be transmitted is very limited. Another disadvantage is that the ball pivot is not located at the center of mass of the surface of the rubber-metal bearing.

DE 10 2005 001 744 B3 discloses another body-side suspension strut bearing in which the piston rod of the shock absorber is coupled separately and with a low spring constant within the body-side absorber bearing. This solution is advantageous in terms of vibration engineering, but the above described transverse forces and squeezing on the suspension strut cannot be precluded.

The object of the invention is to propose a body-side suspension strut bearing of the generic type which is made especially durable and favorable in terms of production engineering and structure.

SUMMARY OF THE INVENTION

It is proposed according to the invention that the joint be formed by a universal joint with two crossing axes of rotation. The universal joint can be loaded the same in the directions of compression and tension and is thus especially durable. Furthermore, it is simple in terms of production engineering and requires little installation space, especially in the axial direction of the suspension strut.

In one advantageous development the universal joint can be connected between the body of the vehicle and the absorber bearing. This results in that the coupling and support of the upper spring plate, the piston rod of the shock absorber and optionally a stop buffer as an additional spring can remain structurally unchanged, and no disadvantageous compromises need be made.

The universal joint can be integrated into a body-side, annular receiving plate or receiving ring and a housing ring of the shock absorber bearing in a manner which is favorable in terms of structure and production engineering. In particular, between the annular receiving plate and the housing ring of the shock absorber bearing there can be a ring-shaped spider which is connected to the receiving ring and the housing ring by way of pivot bearings which are diametrically opposite. Due to the annular configuration of the universal joint, the spider can be made especially small.

For this purpose the pivot bearings of the receiving ring and of the housing ring can lie in a uniform joint plane, by which the overall height of the universal joint can be further reduced.

The arrangement of the universal joint can preferably be such that its one axis of rotation is aligned parallel to the pivoting axis of that wheel suspension element to which the suspension strut is coupled.

Furthermore, the pivot bearings of the universal joint can be formed in a structurally favorable manner by pivot pins or bearing bolts which are screwed into the receiving ring and/or into the spider and which are guided in the corresponding bearing receivers. The bearing receivers can preferably be formed by bearing bushes or inserted antifriction bearings.

In contrast to the ball and socket joint solution known from the prior art, in the universal joint according to the invention the pivot pins project rotationally symmetrically enclosed into the receiving ring, the joint retainer and/or the housing ring. In this way the universal joint, in contrast to the ball and socket joint solution, can also easily withstand tensile loads without the risk of parts of the universal joint "popping out".

To achieve a simple installation capacity of the universal joint, the pivot pins of the pivot bearings between the spider and the housing ring can be screwed from the outside to the inside into the spider and the bearing bolts of the pivot bearings can be screwed from the outside to the inside into the receiving ring between the receiving plate and the spider. First the spider with the housing ring and then the receiving ring are mounted accordingly on the spider.

The above described suspension strut bearing can preferably be used on a suspension strut with integrated adjustment of the level of the vehicle body, the adjusting device being provided with a ball screw drive which is located around the telescoping shock absorber and which adjusts the spring plate of the bearing spring relative to the body by an electric motor by way of a pivot-mounted threaded spindle and a nut screw which is supported to be able to move axially. In the preferred use, the transverse forces and squeezing both on the piston rod of the shock absorber and also on the adjustment device can be eliminated with the ball screw drive.

DETAILED DESCRIPTION OF THE PREFERRED EMBODIMENT OF THE INVENTION

Figure 1:
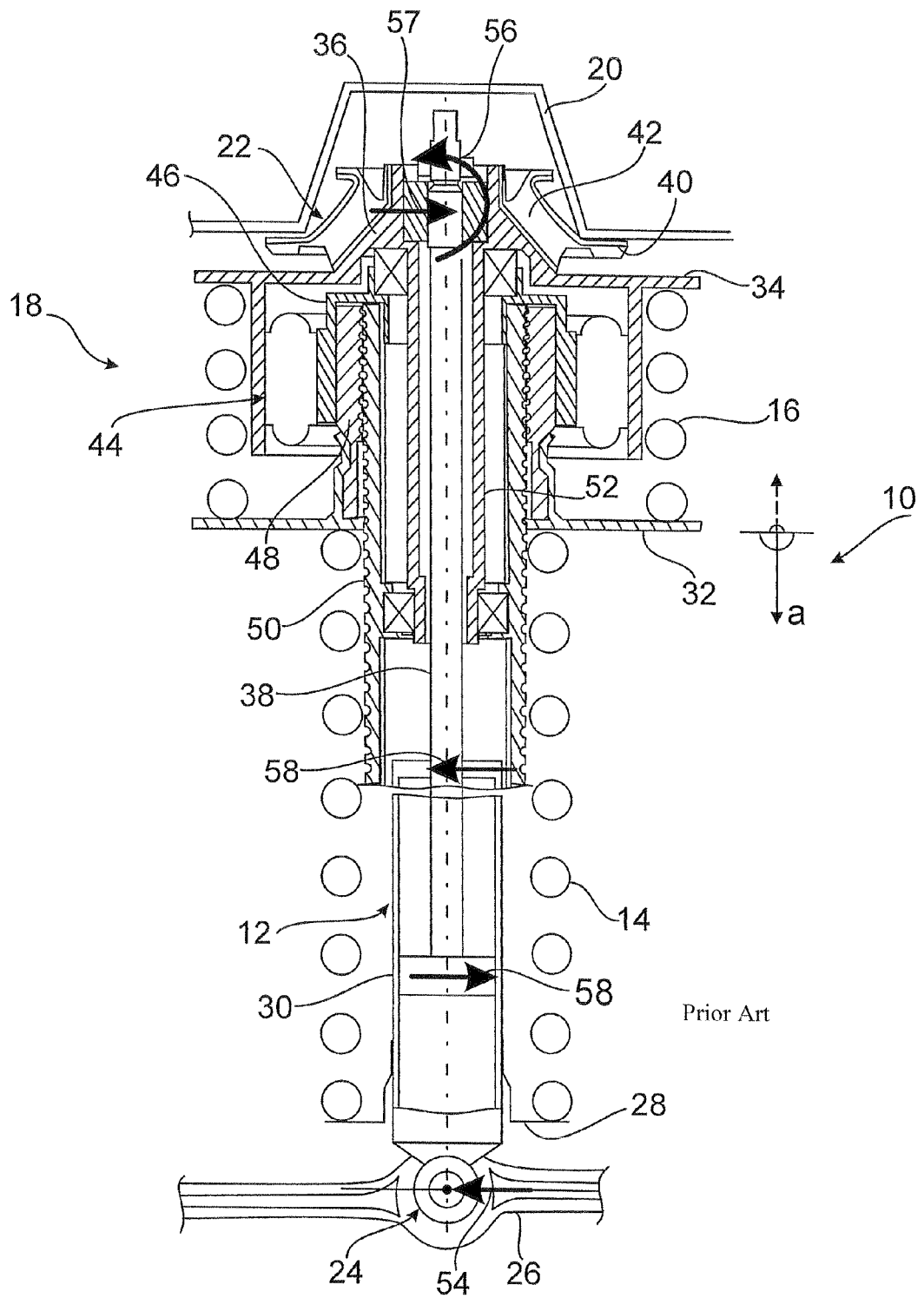
FIG. 1 shows a suspension strut which is coupled to the body and to the suspension arm of a wheel suspension for motor vehicles with a representation of the transverse forces and squeezing which originate from the spring deflection and rebound movements and by superimposed steering movements.
Figure 2:
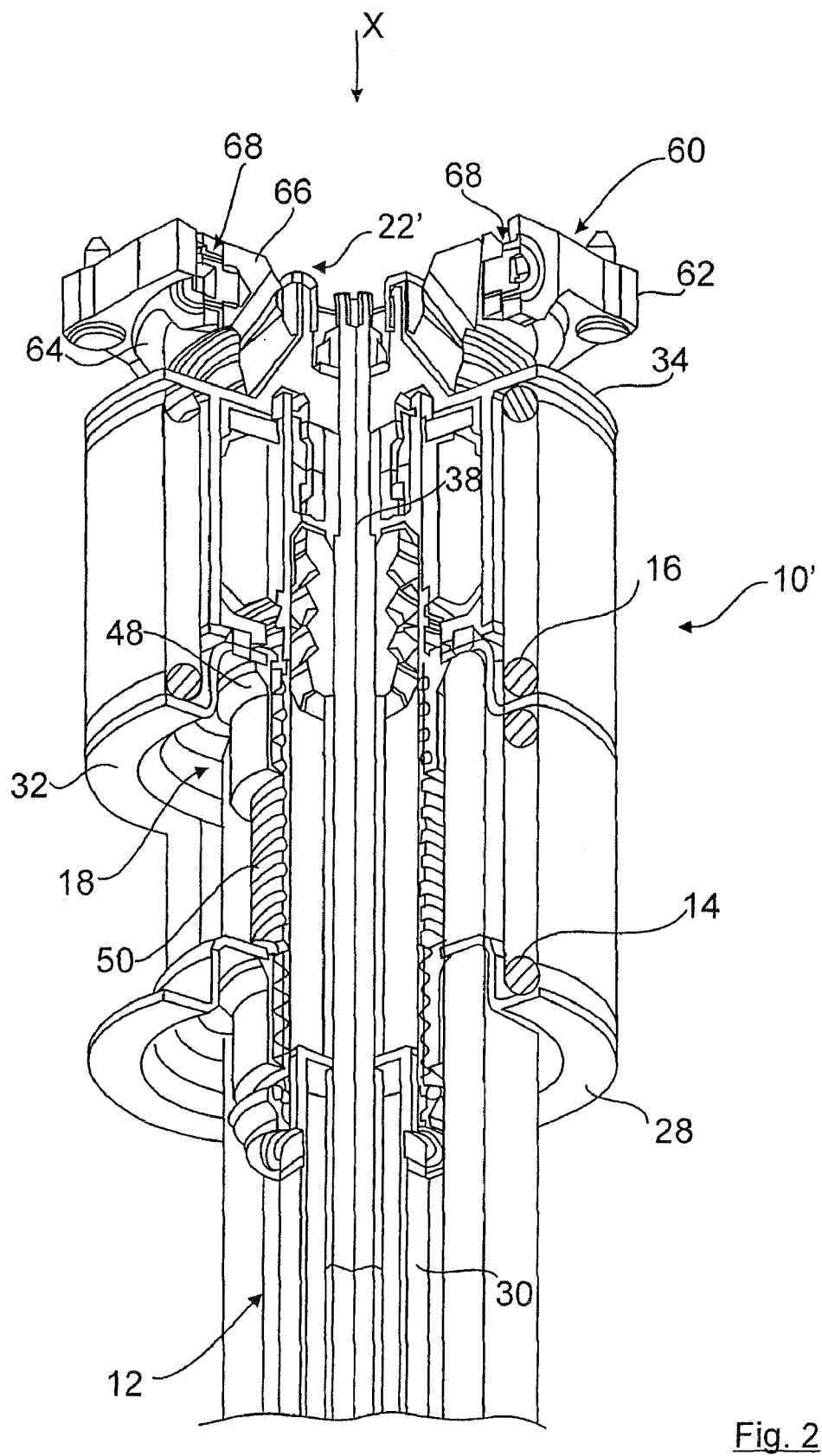
FIG. 2 shows in sections the suspension strut as shown in FIG. 1, but with a universal joint between the body and the shock absorber bearing of the suspension strut.
Figure 3:
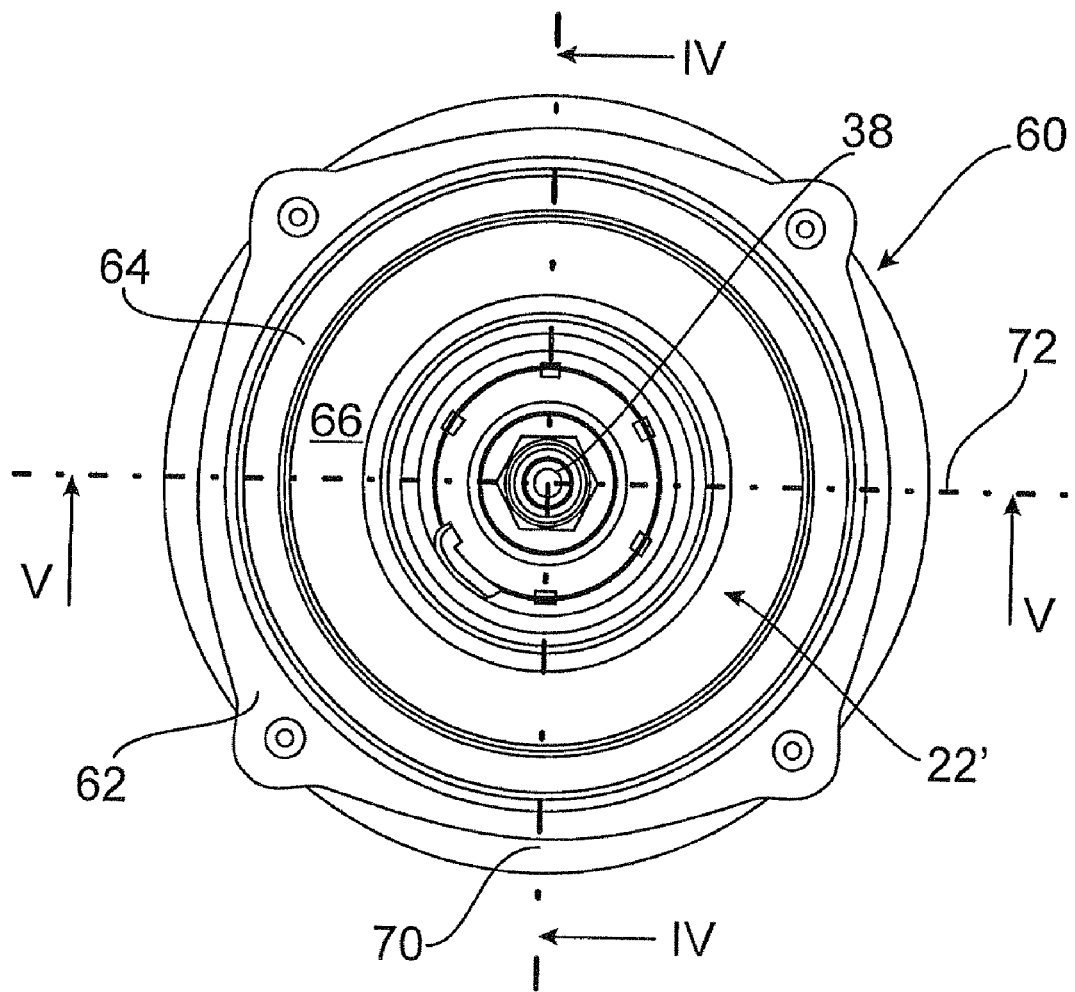
FIG. 3 shows a top view of the receiving plate and the absorber bearing of the suspension strut according to arrow X of FIG. 2.

FIG. 1 shows a suspension strut 10 which corresponds to the prior art according to DE 10 2005 001 744 B3, with a telescoping shock absorber 12, a bearing spring 14 which is formed by a helical compression spring, a compensating spring 16 and a height adjustment device 18.

The suspension strut 10 as a part of the wheel suspension for a motor vehicle on the one hand is coupled to the body 20 by way of a shock absorber bearing 22 and on the other hand via a rubber-metal bush bearing 24 to a suspension arm 26 as the wheel suspension element of the wheel suspension.

The bearing spring 14 is firmly supported on its lower end via a spring plate 28 on the tube 30 of the shock absorber 12 and on its upper end adjoins the axially movable spring plate 32.

The compensating spring 16 which is likewise made as a helical compression spring is clamped between the spring plate 32 and the upper spring plate 34, the spring plate 34 being supported on the shock absorber bearing 22 by way of a bearing core 36 to which the piston rod 38 of the shock absorber 12 is also attached.

The shock absorber bearing 22 has a receiving plate 40 which is attached to the body 20 of the vehicle; the rubber-elastic, annular absorber body 42 of the shock absorber bearing 22 is inserted between the receiving plate 40 and the bearing core 36.

The absorber bearing 22 in other respects is designed to largely eliminate high frequency vibrations which would travel from the roadway via the chassis into the body 20. Moreover, the shock absorber bearing 22 mitigates roadway impacts, for when driving over obstructions, over sections of poor road, or for potholes. I.e., that the absorber bearing 22 is designed according to special, progressive characteristics which intentionally tend to harden the bearing 22 as the spring path increases. The absorber bearing 22 when driving is not insignificantly squeezed and thus hardened.

The height adjustment device 18 is composed essentially of an electric motor 44 which is located around the piston rod 38 of the shock absorber 12 and within the compensating spring 16; the rotor 46 of the motor drives a threaded spindle 50 which is pivot-mounted on a fixed inner bushing 52.

The threaded spindle 50 interacts propulsively with the nut screw 48 of the height adjustment device 18 such that when the threaded spindle 50 is turned by an electric motor, the nut screw 48 which is securely connected to the spring plate 32 is pushed in the axial direction a. In this way the pretensioning of the bearing spring 14 is adjusted as required to achieve a level adjustment of the body of the motor vehicle.

A detailed description of the suspension strut 10 shown in FIG. 1 can be omitted within the scope of this invention, The dynamic loads acting on the suspension strut 10 while driving are described below using FIG. 1: In the course of driving, cardanic motion with torque (arrow 56) and a transverse force component (arrow 57) are imposed on the suspension strut 10 by the kinematics (arrow 54) of the suspension arm 26 over the spring path and/or steering motion, by which the shock absorber bearing 22 is squeezed or hardened.

Since in FIG. 1 the shock absorber tube 30 is not supported relative to the ball roller spindle 50, from this squeezing of the shock absorber bearing 22 support forces 58 acting necessarily in the transverse direction arise as a force pair in the respective guides of the piston rod 38 and of the shock absorber tube 30. The normal forces in the guides as a result cause unwanted friction, by which disadvantageous stick-slip effects necessarily occur which adversely affect proper shock absorber function. This proper shock absorber function would occur when the suspension strut 10 is free of transverse forces and can thus work without friction.

With elastic deformations of the suspension strut components which occur when driving, the rotating threaded spindle 50 can graze the oscillating shock absorber.

As shown in FIGS. 2 to 5, the suspension strut 10', which to the extent not described can be made as shown in FIG. 1 and is provided with the same reference numerals, is connected via a universal joint 60 to the body 20 (not shown) of the motor vehicle.

Figure 4:
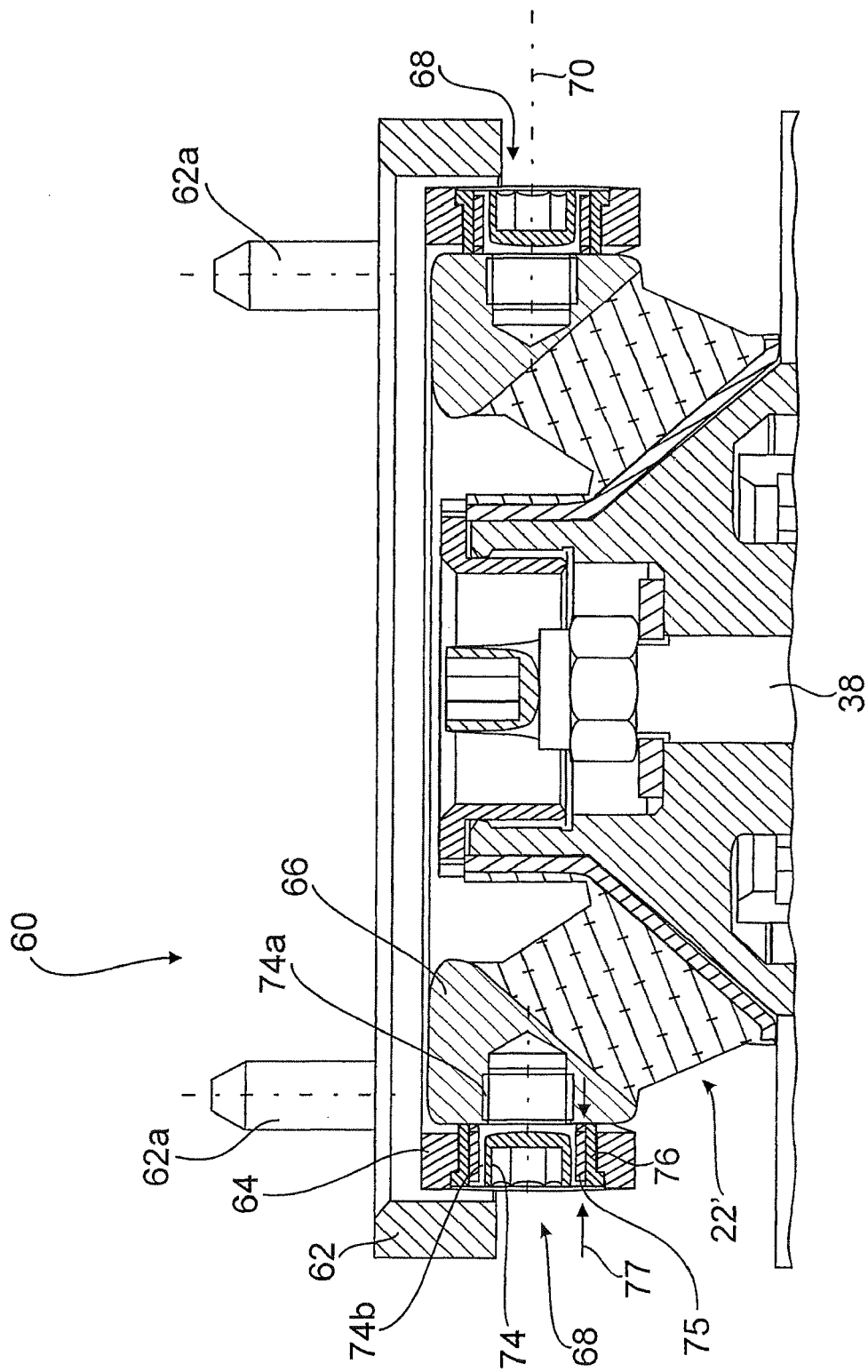
FIG. 4 shows a section along line IV-IV of FIG. 3 through the absorber bearing with the universal joint and receiving plate.
Figure 5:
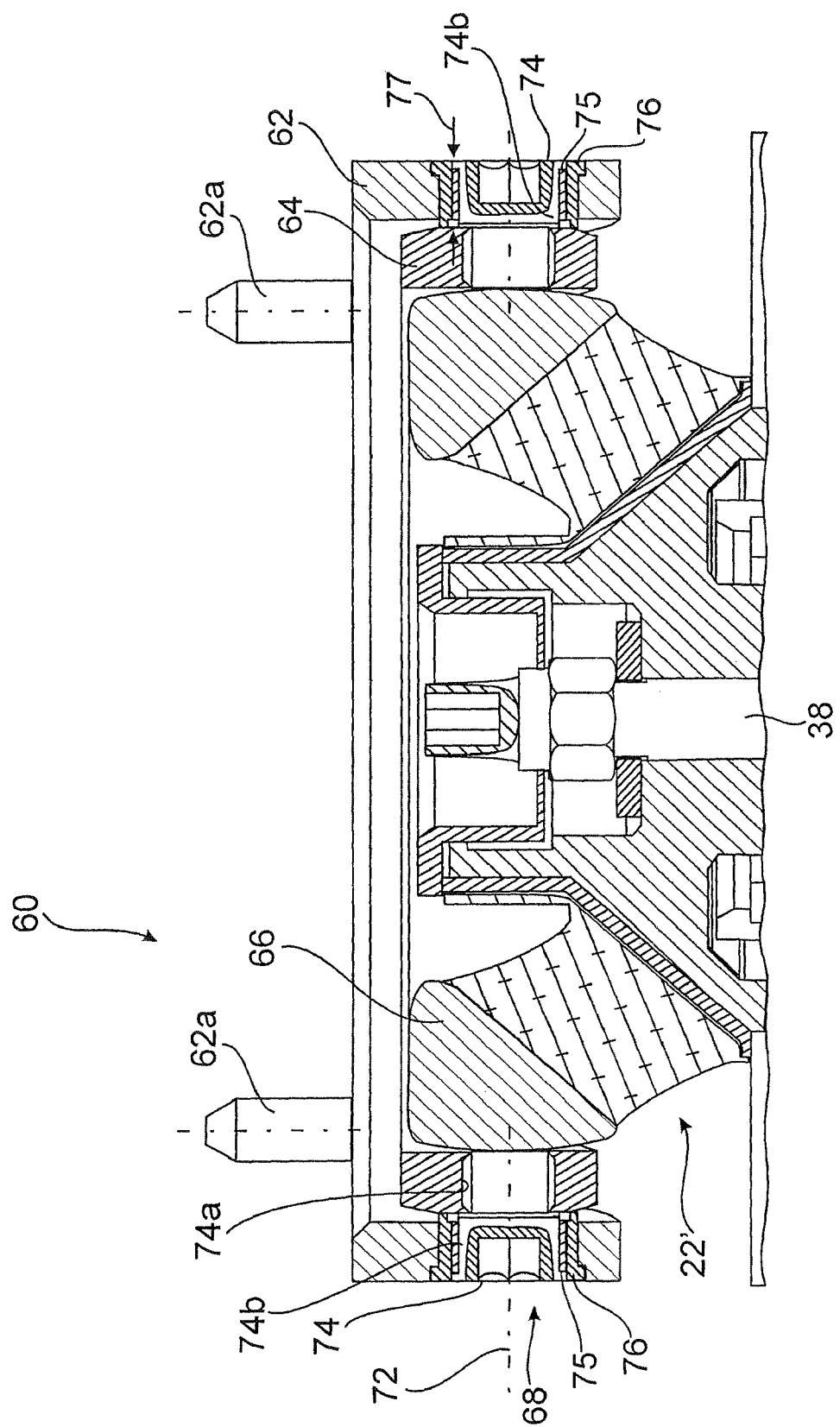
FIG. 5 shows another section according to line V-V of FIG. 3 through the absorber bearing with the universal joint and receiving plate.

The universal joint 60 is connected between the upper shock absorber bearing 22' and the body 20 (cf. FIGS. 4 and 5).

The universal joint 60 is formed from a radially outside receiving ring 62 which is provided with studs 62a for attachment to the body 20. Radially within the receiving plate 62 there is a ring-shaped spider 64. In turn radially within the spider 64 is the housing ring 66 of the shock absorber bearing 22'.

The spider 64 of the universal joint 60 is connected to the receiving ring 62 and the housing ring 66 as shown in FIG. 5 by way of diametrically opposite pivot bearings (uniformly designated as 68), the axes of rotation 70, 72 (cf. FIG. 3) being offset 90 degrees to one another. One axis of rotation 70 is aligned such that seen in a top view it is aligned parallel to the pivot axis (not shown) of the wheel suspension element or suspension arm 26.

Furthermore, the pivot bearings 68 lie in a uniform joint plane 70, 72 such that, as is to be seen in FIGS. 4 and 5, the housing ring 66, the spider 64 and the receiving ring 62 are arranged internested into one another (small overall height).

The pivot bearings 68 are each formed by a swivel pin 74 which has been screwed into the housing ring 66 (cf. FIG. 4) or into the spider 64 (FIG. 5), with a threaded section 74a of greater diameter, an internal hexagon (without reference numeral) for a mounting tool and a cylindrical bearing section 74b, the bearing section 74b projecting into a bearing receiver 76 in the spider 64 or in the receiving plate 62 respectively. In the illustrated embodiment the bearing receiver 76 is a bush which has been pressed in the spider 64 (FIG. 4) or in the receiving ring 62.

As shown in FIGS. 4 or 5, a bearing bush 75 is pushed onto the cylindrical bearing section 74b of the pivot pin 74. The bearing bush 75 is braced with the pivot pin 74 in the illustrated installed state, as is indicated with the arrows 77. In cardanic motion therefore the bearing bush 75 which is braced nonrotatably with the swivel pin 74 slides in the peripheral direction within the bush 76 which has been pressed in.

In contrast to the ball and socket joint solution known from the prior art, in the universal joint 60 according to the invention the pivot pins 74 are rotationally symmetrically enclosed by the receiving ring 62, the joint retainer 64, and by the housing ring 66.

Therefore the universal joint 60, in contrast to the ball and socket joint solution, can withstand compressive loading just as well as tensile loading without the danger of the universal joint parts "popping out" under tensile loading.

As FIGS. 4 and 5 furthermore show, the bearing bolts 74 are each inserted from radially outside to the inside, when the universal joint 60 is installed first the spider 64 being connected to the housing ring 66 of the shock absorber bearing 22' and then the receiving ring 62 being connected to the spider 64.

The structural unit which has been premounted in this way with the suspension strut 10' can then be screwed to the body 20 of the motor vehicle by way of the receiving ring 62.

The suspension strut 10' can preferably be made according to FIG. 1 with a compensating spring 16 and a height adjustment device 18. The invention, however, can also be used in suspension struts with only one bearing spring 14 and one telescoping shock absorber 12.

The invention claimed is:

1. A body-side suspension strut bearing for wheel suspensions of motor vehicles, with a suspension strut which includes a telescoping shock absorber and a bearing spring, and which is supported by way of a shock absorber bearing on a body of a motor vehicle and by way of another bearing on a wheel suspension element of the motor vehicle, there being a joint between the body and the suspension strut wherein the joint is formed by a universal joint with two crossing axes of rotation, and wherein between a receiving ring and a housing ring of the shock absorber bearing there is a ring-shaped spider which is connected to the receiving ring and the housing ring by way of pivot bearings which are diametrically opposite.

2. The suspension strut bearing according to claim 1 wherein the pivot bearings of the receiving ring and of the housing ring lie in a uniform joint plane.

3. The suspension strut bearing according to claim 1 wherein the pivot bearings are formed by bearing bolts which are screwed into the receiving ring and/or into the spider and which are guided in corresponding bearing receivers.

4. The suspension strut bearing according to claim 3 wherein the bearing receivers are formed by bearing bushes or antifriction bearings.

5. The suspension strut bearing according to claim 3 wherein the bearing bolts of the pivot bearings between the spider and the housing ring are screwed from the outside to the inside into the spider and the bearing bolts of the pivot bearings between the receiving ring and the spider are screwed from the outside to the inside into the receiving ring.

6. An assembly for connecting a strut of a wheel suspension system of a vehicle to the body of said vehicle, comprising:
   a first rigid, annular member connectable to said body;
   a second rigid, annular member nested within and connected to said first member for pivotal movement relative to said first member about a first axis;
   a third rigid, annular member nested within and connected to said second member for pivotal movement relative to said second member about a second axis; and
   a fourth annular member formed of a cushioning material nested within and connected to said third member and connectable to said strut.

7. An assembly according to claim 6 wherein said first and second axes are in perpendicularly disposed planes.

8. An assembly according to claim 7 wherein a centerline of said strut lies in said planes.

9. An assembly according to claim 6 wherein said fourth member is formed of an elastomeric material.

10. An assembly according to claim 6 wherein at least one of the interfaces between said third and fourth members and between said fourth member and said strut, has a frusto-conical configuration disposed coaxially with a centerline of said strut, when said assembly interconnects said body and said strut.

11. An assembly according to claim 6 wherein said fourth member is connected to an end of a shock absorber forming a portion of said strut.

* * * * *

UNITED STATES PATENT AND TRADEMARK OFFICE
CERTIFICATE OF CORRECTION

PATENT NO. : 7,857,335 B2
APPLICATION NO. : 12/111042
DATED : December 28, 2010
INVENTOR(S) : Michel Wilfried It is certified that error appears in the above-identified patent and that said Letters Patent is hereby corrected as shown below:

Col. 5, claim 4 line 2 "beating", replace with "bearing"

Col. 6, claim 5 line 2 "beating", replace with "bearing"

Signed and Sealed this
Twenty-first Day of June, 2011

David J. Kappos
*Director of the United States Patent and Trademark Office*

UNITED STATES PATENT AND TRADEMARK OFFICE
CERTIFICATE OF CORRECTION

PATENT NO. : 7,857,335 B2
APPLICATION NO. : 12/111042
DATED : December 28, 2010
INVENTOR(S) : Michel Wilfried It is certified that error appears in the above-identified patent and that said Letters Patent is hereby corrected as shown below:

Column 5, line 31 (claim 4 line 2) "beating", replace with "bearing"

Column 6, line 2 (claim 5 line 4) "beating", replace with "bearing"

This certificate supersedes the Certificate of Correction issued June 21, 2011.

Signed and Sealed this
Twenty-sixth Day of July, 2011

David J. Kappos
*Director of the United States Patent and Trademark Office*